United States Patent [19]

Boulos et al.

[11] Patent Number: 5,268,196
[45] Date of Patent: Dec. 7, 1993

[54] PROCESS FOR FORMING ANTI-REFLECTIVE COATINGS COMPRISING LIGHT METAL FLUORIDES

[75] Inventors: Edward N. Boulos, Troy; Mark F. Best, Taylor, both of Mich.; Joseph H. Simmons; Stephen J. Pagano, both of Gainsville, Fla.

[73] Assignee: Ford Motor Company, Dearborn, Mich.

[21] Appl. No.: 357,918

[22] Filed: May 30, 1988

[51] Int. Cl.$^5$ .......................... B05D 5/06; B05D 3/02
[52] U.S. Cl. ..................................... 427/165; 427/168; 427/226; 427/110; 428/195; 359/580; 359/493
[58] Field of Search .............. 427/165, 226, 110, 168; 428/195; 350/399, 164, 166

[56] References Cited

U.S. PATENT DOCUMENTS

| | | | |
|---|---|---|---|
| Re. 22,076 | 4/1942 | Cartwright et al. | 359/580 |
| 2,337,460 | 12/1943 | French | 427/309 |
| 3,176,574 | 4/1965 | Socha | 427/586 |
| 3,738,732 | 6/1973 | Ikeda | 359/588 |
| 4,535,026 | 8/1985 | Yoldas et al. | 428/310.5 |
| 4,721,632 | 1/1988 | Brown | 427/165 |
| 4,765,729 | 8/1988 | Taniguchi | 427/165 |

*Primary Examiner*—Shrive Beck
*Assistant Examiner*—Roy V. King
*Attorney, Agent, or Firm*—Lorraine S. Melotik; Roger L. May

[57] ABSTRACT

This invention is directed to a process for forming coatings comprising light metal fluorides on a substrate. More particularly, the coating comprising light metal fluorides is preferably made using sol-gel techniques and may comprise a concentration gradient of the light metal fluorides across the thickness of the coating to provide it with unique anti-reflective properties.

17 Claims, 1 Drawing Sheet

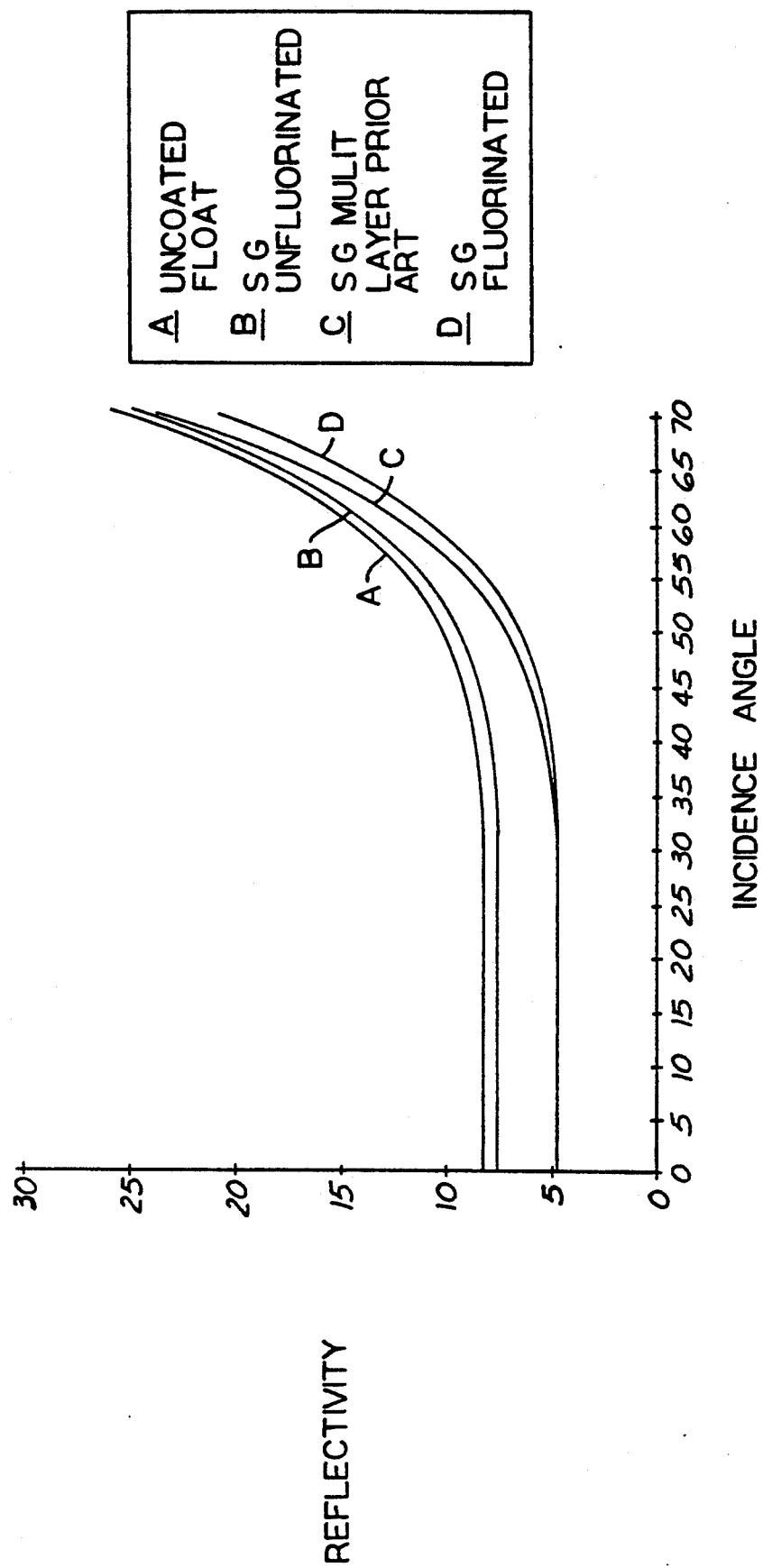

PROCESS FOR FORMING ANTI-REFLECTIVE COATINGS COMPRISING LIGHT METAL FLUORIDES

BACKGROUND OF THE INVENTION

1. Field of the Invention

This invention is directed to a substrate carrying thereon a coating comprising light metal fluorides and a preferred process for forming same. The preferred process comprising using sol-gel techniques to form the coating which may comprise a concentration gradient of the light metal fluorides across the thickness of the coating to provide it with unique anti-reflective properties over wide viewing angles.

2. Discussion of the Related Art

Various attempts have been made in the art to modify the amount of light reflected by substrates. Uncoated window or windshield glass with an index of refraction of about 1.5 reflects a portion of the light incident upon it. At normal (perpendicular) incidence, the reflection is 4 percent per surface, yielding an 8 percent reflection by the glass (considering the two surfaces of the glass). For this uncoated glass, the reflection coefficient increases to about 15 percent at a 60° angle tilt of the glass with respect to the vertical and to 26 percent at a 70° tilt with respect to the vertical. Since in automotive glass applications (e.g., windshields), the glass often displays tilt angles as high as 70° from the vertical, the reflection coefficient of the glass is undesirably high. Current practice is to modify the reflectivity of the glass by providing the glass with anti-reflection coatings made of single or multiple films. Prior art coatings may provide the glass with reflection coefficients as low as ½ percent when the glass is positioned vertically and the incident light is of a particular wave length. But, as one tilts the angle of the glass, that is, angles it with respect to the vertical, the reflection coefficient of the coated glass increases even when such anti-reflective coatings are used. For example, when using a conventional triple layer coating comprising a first layer of a mixture of titanium oxide and silicon oxide, a second layer of titanium oxide and a third layer of silicon oxide, the reflection coefficient of the coated glass increases to about 8.4 percent as the glass is positioned at 6° with respect to the vertical and to 21 percent as the glass is positioned at a 70° angle with respect to the vertical. In using a conventional single layer coating comprising, for example, fused silica, the reflection coefficient of the coated glass increases to about 11 percent for a glass angled at 60° with respect to the vertical and to 23 percent for a glass positioned at 70° with respect to the vertical. In all of these cases, the reflectivity coefficient increases substantially if one changes the wave length (color) of the incident light. It is highly desirable in automotive applications to utilize coatings for glass which lower the reflection coefficient even of highly tilted glass such as a windshield at substantially all colors of the visible spectrum of incident light.

U.S. Pat. No. 2,337,460 discloses reducing the reflection from glass surfaces by forming upon the surface of the glass films rich in calcium fluoride and of such thickness as to inhibit or reduce the reflection from the surface. According to the reference, the films are formed by first treating the glass with a strong mineral acid to leach out soluble alkali and alkali earth compounds and leave a surface film rich in calcium and silica compounds. It is further taught therein that the surface is then treated with hydrogen fluoride in vapor phase to remove silica and to convert the calcium compounds into a film of calcium fluoride. One disadvantage with such a process is that by treating the glass surface with the acid, a haze is formed on the glass surface which reduces the optical quality of the glass. Further, the thin calcium fluoride layer formed on the glass according to that technique will have less than desirable durability. U.S. Pat. No. 3,176,574 discloses a two layer coating taught useful to provide low reflectivity with respect to all colors of the visible spectrum and a method of making the coating. It includes an outer layer of a low index low reflection material such as magnesium fluoride and an inner layer comprising a high index material such as lanthanum oxide. The index of refraction of the inner layer on the substrate is graded from low to high index of refraction proceeding outwardly from the glass. This reference teaches that the index of refraction of the inner layer may be graded by varying the oxygen content of this layer when it is applied by high temperature, vacuum evaporation techniques. One of the difficulties with making a graded index film as disclosed in the patent is that critical conditions are required to form a graded index by the vacuum evaporation techniques disclosed therein. In U.S. Pat. No. 3,738,732 anti-reflective coatings are disclosed which comprise at least three layers of materials deposited in vacuum, each layer having a defined optical thickness and refractive index. U.S. Pat. No. 4,535,026 discloses silica coatings which are graded in porosity in order to be substantially non-reflecting over a wide band of radiation. In order to form such a coating, a porous silica layer is first formed on the substrate and then the silica layer is etched in order to enlarge the pores in a graded fashion, being more porous near an exposed surface. The index of refraction of the layer is taught to vary so that the index of refraction of the exposed surface of the layer approaches that of air and so that the index of refraction of the layer surface nearest the substrate approaches the index of refraction of the substrate. Such techniques, however, result in coated substrates which are of less than desirable optical quality and durability, since impurities can be trapped in the pores. U.S. reissued patent 22,076 discloses a method to deposit a coating of magnesium fluoride onto a substrate by evaporation. As with all the references disclosed above, the thickness of the film is related to a wave length of the light to be reflected and these coatings will generally only reduce reflection of incident light near that particular wave length.

Additionally, while prior art coatings may provide anti-reflective properties for a substrate such as glass which is positioned vertically, the anti-reflective properties of the glass are substantially diminished when the glass is positioned at a large angle with respect to the vertical.

SUMMARY OF THE INVENTION

This invention is related to a process for forming a coating comprising light metal fluorides on a substrate. The process comprises: providing a coating of a reactive composition comprising: (i) light metal oxide precursor; (ii) non-aqueous solvent; and (iii) water; on a substrate; and heating the coating on the substrate for a time sufficient to densify the coating to form a densified coating comprising light metal oxide. Preferably, the light metal oxide precursor is selected from the group comprising light metal alkoxides, light metal nitrates, light metal acid tartrates and light metal acetates. The method subsequently comprises exposing this densified coating at an elevated temperature to an atmosphere comprising fluorine or fluorine producing gaseous compound for a time sufficient to replace at least a portion of the oxygen atoms of the light metal oxide of the densified coating with fluoride atoms and form the coating comprising light metal fluorides of the Present invention. By controlling the elevated temperature and time during which the densified coating is exposed to the fluorine or fluorine-producing gaseous compound, substantially all the oxygen atoms of the light metal oxide may be replaced with fluoride atoms. On the other hand, the process conditions may be controlled such that only a portion of these oxygen atoms are replaced with fluoride atoms so that densified coating comprises a concentration gradient of light metal fluoride, the concentration gradient being such that the resultant coating comprises a greater concentration of light metal fluoride in a region of the coating distant from the substrate surface and a lesser concentration of light metal fluoride in a region of the coating nearer said substrate surface. Accordingly, the index of refraction would vary in this coating from low to high, respectively, in the region distant from the substrate surface (i.e., the exposed coating surface) to that nearer the substrate surface.

According to another aspect of the invention, it is directed to a substrate carrying thereon a ceramic coating comprising a concentration gradient of light metal fluorides. According to yet another aspect of the invention, it is directed to a substrate carrying thereon a coating comprising light metal fluoride may be made by the process disclosed above.

Advantageously, it has been found that the process invention is useful to form a coating which is extremely durable and for providing such a coating on large surfaces such as the glass surfaces which are made in the float glass process. Further, embodiments of the graded coatings according to the present invention have excellent anti-reflective properties and they maintain these anti-reflective properties even when the position of the substrate on which they are applied deviates by a large angle from the vertical. Additionally, such embodiments display excellent anti-reflective properties for substantially the entire spectrum of visible light.

BRIEF DESCRIPTION OF THE DRAWINGS

FIG. 1 is a graph showing the reflectivity vs. incidence angle of various materials including one according to an embodiment of this invention.

DETAILED DESCRIPTION OF THE PREFERRED EMBODIMENTS

As disclosed above, this invention according to one aspect is directed to a process for forming a ceramic coating comprising light metal fluorides. The details of the process as well as other aspects of the invention will be described in detail hereinafter.

According to the process, a reactive composition is provided as a coating on a substrate. The reactive composition may be formed by combining a light metal oxide precursor, solvent, e.g., alcohol, and optionally water. If water is included as a component in forming the reactive composition before it is applied to the substrate, the non-aqueous would preferably be miscible with water. If water is not included in the reactive composition as applied to the substrate, the water may be introduced into the applied coating (reactive composition) by subsequently exposing the coating to water vapor, e.g., by exposing the coating to atmospheric humidity. The light metal oxide precursor is one which forms a solution or dispersion with the solvent. By light metal is meant metals of group la and group lb of the periodic table of elements, i.e., the alkali metal family and the alkaline earth family, respectively. Exemplary of alkali metals are lithium, sodium and potassium. Exemplary of alkaline earth metals are magnesium, calcium, and strontium. Preferably, at least magnesium oxide precursors are employed in the composition since its fluoride provides the best anti-reflecting properties of such light metals. Exemplary of materials suitable as the light metal oxide precursor are light metal alkoxides, light metal nitrates, light metal acid tartrates, light metal acetates and other salt precursors such as light metal acetyl acetonates. The light metal alkoxides can be expressed by the general chemical formula: $M(OR)_x$, wherein R is an alkyl or branched alkyl group preferably containing 1 to 3 carbon atoms and x is the charge of M. Such alkoxides may be selected from, but are not limited to, magnesium methoxide $(Mg(OCH_3)_2)$, magnesium ethoxide $(Mg(OC_2H_5)_2)$, magnesium n-propoxide $(Mg(OC_3H_7)_2)$, and calcium ethoxide $(Ca(OC_2H_5)_2)$. Exemplary of light metal nitrates, acetates and acid tartrates are magnesium acetate, magnesium nitrate, calcium acetate, calcium nitrate, sodium acid tartrate and potassium acid tartrate. Still other light metal oxide precursors will be apparent to those skilled in the art in view of the present disclosure. As will be apparent to those skilled in the art in view of the present disclosure, compatible mixtures of various light metal oxide precursors also may be employed.

The reactive composition may optionally further comprise still other metal oxide precursors, i.e., in addition to the light metal oxide precursors. For example, the reactive composition may further comprise oxide precursors of materials like silicon, aluminum, boron, zirconium, cerium, and titanium. These oxide precursors could be of the type described above for the light metal oxide precursors, i.e., alkoxides, nitrates, acetylacetonates, etc. which would also form oxides thereof in the densified coating. The metal alkoxides would preferably contain alkoxide groups having 1 to 4 carbon atoms. The oxygen atoms of these oxides, as compared to light metal metal oxides, would not be expected to be replaced with fluoride atoms when the coating is exposed to an atmosphere comprising fluorine or fluorine producing gaseous compound. Hence, these oxides would remain as the oxides, e.g., silicon oxide, in the coating, in this instance being considered a ceramic coating. The presence of oxides such as silicon oxide and aluminum oxide in a ceramic coating of this invention have been found to increase the durability of the coating. Cerium oxide in the coating enhances the ability of the coating to reflect U.V. radiation. If such other oxide precursors are employed in addition to the light metal oxide precursor in forming the reactive composition, they would be employed in a maximum amount of about 95 weight percent based on the total weight of oxide precursors in the composition.

In this reactive composition, the non-aqueous solvent, e.g., alcohol, along with the water, when initially present in the applied composition, functions as a solvent or dispersion medium for the light metal oxide precursor (and optional components). If water is employed initially in forming the reaction composition (i.e., before it is applied to the substrate), the non-aqueous solvent used would be one which is preferably miscible with water. Any of numerous non-aqueous solvents may be employed, many of which are readily commercially available. Exemplary of such solvents are materials like acetone, ethyl acetate, acetyl acetone, methoxy-ethanol, methanol, ethanol, propanol, n-butanol, 2-propanol, and compatible mixtures thereof. When using alcohol as the solvent and a light metal alkoxide as the precursor, it has been found preferable to employ an alcohol that has the same alkyl or branched alkyl group as is present in the alkoxide. For example, when using magnesim methoxide, it has been found that the preferred alcohol solvent is methanol. Such a preference is not however meant to be limiting. Compatible mixtures of non-aqueous solvents also may be employed in this invention. By not including water in the reactive composition before it is applied as a coating, it would be expected to have a longer shelf life, should that be desired. Water, however, is necessary for the reactions which are to take place during the conversion of the metal oxide precursor to the metal oxide. Hence, water can be incorporated into a waterless applied coating by subsequently exposing this applied coating to a water vapor containing environment, e.g., atmospheric humidity.

The pH of the reactive composition may vary from basic to acidic. If it is intended that the anti-reflective coating also be of excellent optical quality and transparent as would be most useful on glass, e.g., a windshield, the pH of the reactive composition is preferably acidic. In such applications, an acid is used preferably in amounts sufficient to provide the reactive composition with a pH of less than about 6.0, more preferably less than about 4.5. Acids which may be employed in the practice of this invention may be selected from any of the numerous organic and inorganic acids, many of which are readily commercially available. Exemplary acids include, but are not limited to, acetic, trifluoroacetic nitric, formic, oxalic, hydrochloric, and compatible mixtures thereof.

According to this invention, it may be desirable to allow the reaction mixture to become viscous prior to providing it as a coating on a substrate. This can be done by simply allowing it to stand for a given time, for example, at room temperature for 24 hours. It may alternately or additionally be desirable to heat the reactive composition to encourage formation of the viscous mixture prior to applying it to the substrate. During the time the mixture is becoming viscous, reactions are taking place wherein the light metal oxide precursor is undergoing reaction with the solvent and the water to form light metal hydroxides. By allowing the reactive composition to form a more viscous mixture prior to providing it as a coating on the substrate, it is easier to control the thickness of the coating to be applied from the mixture and to conveniently provide a coating which is initially more adherent to the substrate.

The substrate on which the coating is applied may be any material, for example, glass, metal, quartz, and ceramic, i.e., any material that could benefit from a coating, including the anti-reflective coating described above. The coating may be applied to the substrate by any technique, including dipping, spraying, rolling, brushing, etc. The optimal technique employed to provide the coating would depend in part on the particular substrate, process conditions, viscosity of the reactive composition, etc. The thickness of the coating of the reactive composition provided on the substrate is generally between about 50 and about 500 nm, although such thickness is not meant to be limiting to the invention. Selection of the optimal thickness of the reactive composition coating provided on the substrate would be dependent on such characteristics as the desired refractive index of the coating, wavelength of particular interest, and the total number of coating layers. Selection of the optimal method of application and thickness of the coating will be apparent to one skilled in the art in view of the present disclosure.

After a coating of the reactive composition is provided on the substrate, which is preferably near room temperature, the substrate is heated for a time sufficient to densify the coating material to form a densified coating comprising light metal oxide. As part of the step to densify the coating material, it may be desirable to first heat the coating to a temperature at which the solvent and water are evaporated and then to further elevate the temperature and maintain that temperature for a time to complete densification of the coating. Temperatures to which the coating may be elevated during densification of the coating are only limited by the particular substrate employed. For example, if the substrate is float glass, the coated substrate would preferably be heated to a maximum temperature of about 560° C. If, on the other hand, the substrate was metal, the coated substrate could be heated to a much higher temperature, whereas if the substrate was plastic, the maximum temperature to which that coated substrate could be heated would probably be less than that employed at maximum temperature for the coated glass substrate. Generally, the temperature of the coated substrate would be raised gradually, generally about 5° to 10° C. per minute to the maximum temperature at which it would be maintained for a time sufficient to densify the coating material and form a densified coating.

While it may be advantageous to raise the temperature of the coated substrate at least about 350° C. above room temperature, the coated substrate can be subjected to various temperatures in order to densify the coating. While higher temperatures may help to speed up the densification process, the densification will nonetheless take place even at the lower temperature. One generally would not want to heat the coated substrate to a temperature higher than about 900°–1000° C., even if such were permissible due to the stability of the substrate, because such a high temperature might interfere with the chemical reactions necessary for formation of the densified solid coating.

The reactive mixture described above and its use in forming a ceramic coating are within the technology generally described as "sol-gel" technology. Sol-gel techniques have been described in numerous references as well as various patents. Exemplary references are C. J. Brinker & G. W. Scherer, J. Non-Crystall. Solids, 70, 301–322 (19 ); S Sakka, Treatise on Materials Science & Technology, 22, 129–167 (198 ) and N. P. Bansal, J. Amer. Ceramic Socl, 71, [8], 666–672 (1988). Teachings of these references with respect to sol-gel technology is herein specifically incorporated by reference.

After a densified coating comprising light metal oxide is formed on the substrate, the densified coating is exposed to an atmosphere comprising fluorine or a fluorine-producing gaseous compound. The fluorine-producing gases may be of a type that form the appropriate fluorine radical at elevated temperature, e.g., organofluorine gaseous compounds like difluoroethane, difluorochloroethane and chlorotri fluoroethylene. These gases produce the appropriate fluorine radical at temperatures between about 300° and 350° C. Other fluorine producing gases can be of the type which produces this appropriate radical by other than conventional heating, e.g., when used in conjunction with plasma generated by DC, RF or microwave instruments. Gases which may be used in conjunction with plasma assistance include, but are not limited to, carbon tetrafluoride, silicon tetrafluoride, hexafluoroethane, hexafluoropropylene and perfluoropropane. Using such later techniques may require additional heating in order to promote the diffusion of fluorine into the densified coating. Still other useful gas or mixtures of such gases will be apparent to those skilled in the art in view of the present disclosure. Hereafter an atmosphere comprising fluorine or a fluorine-producing gaseous compound are termed "fluorine atmosphere". The densified coating is exposed to the fluorine atmosphere at an elevated temperature, i.e., above room temperature, for a time sufficient to replace at least a portion of the oxygen atoms of the light metal oxide of the coating with fluoride atoms. By exposing the coating for a sufficiently long period of time at the elevated temperature, substantially all of the oxygen atoms of the light metal oxide will be replaced with fluoride atoms so as to convert substantially all the light metal oxide to light metal fluoride. On the other hand, if it is desired to form a gradient concentration of light metal of fluoride in the coating, the coating would be exposed to the atmosphere for a time sufficient to replace only a portion of the oxygen atoms of the light metal oxide. In this case, the coating would comprise a greater concentration of light metal fluoride in a region of the coating distant from the substrate surface and a lesser concentration of light metal fluoride in a region of the coating nearer the substrate surface. It has been found that embodiments of coatings having such a concentration gradient provide excellent low reflection coefficients even for highly tilted windows and for all the colors of the visible spectrum of incident light.

A preferred graded coating would have a low refractive index at the outer face with a value as close to 1 as possible (indices between about 1.32 and 1.46 being optimum) and would have a higher refractive index value to match the substrate at the coating-substrate interface. In between these two values, the refractive index of the coating would preferably increase in a smooth monotonic fashion from the low index outer face to the high index coating-substrate face.

While the advantage of applying an anti-reflective graded coating to certain substrates has been discussed herein, the method of this invention is not limited to such graded coatings. According to this invention, the applied coating may be one in which light metal fluorides are present substantially uniformly throughout the entire coating. That is, a coating comprising light metal fluorides substantially uniformly dispersed with other metal oxides such as silicon oxide or a coating consisting essentially of light metal fluorides. The particular coating composition would be dependent on whether the metal oxides of the coating additionally comprise oxides of the type that will not be substituted with fluoride according to the invention, e.g., silicon oxide. Coatings wherein the light metal fluorides are substantially uniformly dispersed may be useful, for example in comparison to $MgF_2$ coatings provided on glass according to prior art techniques, because they have the following advantages. They are more compatible with a glass substrate because the densified coating initially applied to the substrate according to this invention is a ceramic material more like glass. They may be made to have different properties, e.g., optical indices and/or increased durability, by including the optional oxide precursors discussed above in the composition, which results in the ceramic coating containing oxides, like silicon oxide, in addition to $MgF_2$. Other uses of the coatings of this invention, i.e., for other than anti-reflective purposes, include optical waveguides which can be fabricated with coating of low index and ridge waveguides whereby the coating is limited to a thin strip.

The invention will be further understood by referring to the following detailed examples. It should be understood that the specific examples are presented by way of illustration and not by way of limitation.

Examples 1-5 describe the preparation of reactive compositions useful for forming graded index anti-reflective ceramic coatings according to this invention.

EXAMPLE 1

96 g of tetraethylorthosilicate (TEOS) is combined with 312 g of ethanol containing 6.93 g of acetic acid. The mixture is heated under reflux for 2 hrs. and cooled to room temperature. 63 g of magnesium acetate $[Mg(C_2H_3O_2)\cdot 4H_2O]$ is dissolved in 312 g of alcohol acidified with acetic acid to give a pH of 2.8. After the magnesium acetate dissolves it is added slowly to the partially hydrolyzed TEOS. This mixture is stirred for 1 hr. to dissolve any remaining material and homogenize the solution.

This solution is aged for several days at room temperature or for several hours under reflux to obtain the appropriate viscosity of 1.8 centipoise. The solution is transferred to a dipping tank whose depth is equal to the length of a substrate to be coated. In this example a piece of cleaned float glass is immersed in the solution and withdrawn at 15 cm/minute. The coated float glass is air dried at room temperature prior to being transferred to a drying oven at 80° C. for 10 minutes. It is subsequently heated to 500° C. at 5° C./minute and soaked at that temperature for 2 hours to densify the coating. The densified film thickness and refractive index are measured using an ellipsometer and yield values of $107 \pm 5$ nm and $1.49 \pm 0.01$, respectively. The densified film is calculated to be of a composition based upon the formula, $xMgO-(100-x)SiO_2$; $x=10$ to 30 wt %.

The subsequent fluorination treatment to provide a concentration gradient of $MgF_2$ in the coating is carried out as follows: the densified $MgO-SiO_2$ coated float glass is heated to 300° C. in an air atmosphere and, after reaching thermal equilibrium, is exposed to a difluoroethane gas atmosphere for 15 minutes and subsequently cooled to room temperature. After the fluorination, the graded film refractive index is observed to decrease to $1.45 \pm 0.01$.

FIG. 1 compares the change in reflection versus incidence angle of (A) uncoated float glass, (C) float glass coated with the "conventional triple layer coating" described hereinbefore, (D) float glass coated with the fluorinated sol-gel (SG) coating prepared in this example, and (B) float glass coated with the densified (unfluorinated) material made in this example. At an incidence angle of 70° the uncoated float glass, commercial AR film, and fluorinated and unfluorinated films have a reflectivity of 26, 24, 21, and 25 percent, respectively.

This reduction in reflectivity is indicative of the film having a graded index of refraction from the surface of the film increasing toward the film/substrate interface.

Additional examples follow describing the solution preparation as a means to improve the film durability and diffusion of the fluorine-containing gas.

EXAMPLE 2

103 g of TEOS is combined in a three-neck flask with 325 g of ethanol containing 8.9 ml of $H_2O$ and 0.158 ml of $HNO_3$ (70% by wt.) under constant stirring. The mixture is heated to 60° to 70° C. for 2 hrs. The mixture is cooled to room temperature and 9.6 g of aluminum sec-butoxide $[Al(O^sBu)_3]$ in 17.3 ml of 2-propanol is added slowly under vigorous stirring. The mixture is generally clear at this point and is stirred for 1 hr. 42 g of magnesium acetate is dissolved in 328 g of ethanol. After the magnesium acetate completely dissolves it is slowly added to the mixture above and the ternary solution is stirred for 2 hrs. to completely dissolve any remaining material. This resultant solution is used as described in Example 1 to form a coating on float glass. The densified film from the above solution is calculated to be of a composition based upon the formula, $xAl_2O_3$—$20MgO(80-x)SiO_2$; $x=5$ to $10$ wt %. The addition of $Al_2O_3$ in the film not only improves the durability but also aids in the diffusion of the fluorine-containing gas into the structure. This improved diffusion of the fluorine-containing gas is improved because the structure is more open with the $Al_2O_3$ in the film.

EXAMPLE 3

The identical composition, in Example No. 2, can be formed using the following procedure. 103 g of TEOS is combined in a three-neck flask with 325 g of ethanol containing 8.9 ml of $H_2O$ and 0.158 ml of $HNO_3$ (70% by wt.) under constant stirring. The mixture is heated to 60° to 70° C. for 2 hrs. 14.6 g of aluminum nitrate $[Al(NO_3)_3.9H_2O]$ is dissolved in a 100 g mixture of water and ethanol. After the aluminum nitrate is dissolved it is added slowly to the cooled partially hydrolyzed TEOS solution above. The mixture is stirred for a period of 1 hr. or until any undissolved material goes into solution. 42 g of magnesium acetate is dissolved in 228 g of ethanol. After the magnesium acetate completely dissolves it is slowly added to the mixture above and the ternary solution is stirred for 2 hrs. to completely dissolve any remaining material.

EXAMPLE 4

9.6 g of aluminum sec-butoxide is combined with 32 ml. of 2M sodium methoxide ($NaOCH_3$) in methanol (MeOH) in a reaction container. The mixture is stirred at room temperature for 30 minutes to form a complex metal alkoxide, a heteropolar alkoxo salt. To this complex metal alkoxide is added 12.3 g of diethanolamine (DEA) with constant stirring for 30 minutes. This mixture is added to 96 g of TEOS in 325 g of 2-propanol in a reaction flask and the combined mixture is stirred for 2 hrs. in the reaction flask. 22.5 g of magnesium ethoxide $[Mg(OEt)_2]$ is combined with 328 g of 2-propanol and stirred until the $Mg(OEt)_2$ completely dissolves. This mixture of $Mg(OEt)_2$ in 2-propanol is then slowly added to the flask containing the TEOS, $Al(O^sBu)_3$, and $NaOCH_3$ in 2-propanol. The mixture is stirred for 2 hrs. to dissolve any remaining material. This resultant solution is used as described in Example 1 to form a coating of a float glass substrate. After the film is deposited on the float glass substrate, the water required to generate the hydrolysis and condensation reactions to convert the precursor to metal oxide is derived from the atmospheric humidity The densified film from the above solution is calculated to be of a composition based upon the formula, $xNa_2O$—$yAl_2O_3$—$20MgO(80-x-y)SiO_2$; $x=5$ to $10$ wt % and $y=0$ to $5$ wt %. In this example the presence of $Na_2O$ in the film aids in more closely matching the refractive index of the float glass substrate since the sodium cations enter the film structure in modifying Positions. However, after the fluorination step, the formation of NaF in a graded fashion with the greater concentration of NaF being near the exposed surface of the coating, is beneficial since the refractive index near the surfacing of this coating is 1.33.

EXAMPLE 5

The identical composition, in Example No. 4, can be formed using the following procedure. 96 g of TEOS is combined in a three-neck flask with 325 g of ethanol containing 8.3 ml of $H_2O$ and 0.150 ml of $HNO_3$ (70% by wt.) under constant stirring. The mixture is heated to 60° to 70° C. for 2 hrs. The mixture is cooled to room temperature and 9.6 g of aluminum sec-butoxide in 17.3 ml of 2-propanol is added slowly under vigorous stirring. The mixture is generally clear at this point and is stirred for 1 hr. 32 ml of 2M $NaOCH_3$ is slowly added to the above mixture of TEOS and aluminum sec-butoxide in ethanol and 2-propanol with constant stirring. This ternary mixture is stirred for an additional period of 1 hr. prior to adding the final component. 42 g of magnesium acetate is dissolved in 328 g of ethanol. After the magnesium acetate completely dissolves it is slowly added to the mixture above and the quaternary solution is stirred for 2 hrs. to completely dissolve any remaining material.

While particular embodiments of the invention have been described, it will be obvious to those skilled in the art that various changes and modifications may be made without departing from the invention, and it is intended to cover in the appended claims all such modifications and equivalents as fall within the true spirit and scope of this invention.

We claim:

1. A process for forming an anti-reflective coating comprising light metal fluorides on a substrate, said process comprising:
    providing a coating of a reactive composition comprising: (i) light metal oxide precursor, (ii) non-aqueous solvent, and (iii) water on said substrate;
    heating the coated substrate for a time sufficient to densify the coating material to form a densified coating comprising light metal oxide; and
    exposing said densified coating at an elevated temperature to an atmosphere comprising fluorine gas or a fluorine producing gaseous compound for a time sufficient to replace only a portion of the oxygen atoms of said light metal oxide of said densified coating with fluoride atoms so that said densified coating comprises a concentration gradient of light metal fluoride to thereby form said anti-reflective coating.

2. The process according to claim 1, wherein said light metal oxide precursor is selected from the group consisting essentially of light metal alkoxides, light metal nitrates, light metal acid tartrates, and light metal acetates.

3. The process according to claim 1, wherein said light metal oxide precursor comprises a magnesium oxide precursor.

4. The process according to claim 1, wherein said composition further comprises other oxide precursors selected from silicon oxide precursors, zirconium oxide precursors, titanium oxide precursors, cerium oxide precursors, or aluminum oxide precursors.

5. The process according to claim 4, wherein said other oxide precursors are selected from alkoxides, nitrates, acid tartrates, or acetates.

6. The process according to claim 1, wherein said pH of said reactive composition is adjusted to less than about 6.0 by means of acid.

7. The process according to claim 1, wherein said water is provided in said reactive composition coating by exposing a coating comprising said light metal oxide (i) and said non-aqueous solvent (ii) to water vapor.

8. The process according to claim 1, wherein said process further comprised causing said reactive composition to become viscous prior to Providing it on said substrate.

9. The process according to claim 1, wherein said concentration gradient being such that said densified coating comprises a greater concentration of light metal fluoride in a region of said densified coating distant from said substrate surface and a lesser concentration of light metal fluoride in a region of said densified coating nearer said substrate surface.

10. A process for forming a ceramic coating, comprising a concentration gradient of light metal fluorides, on a substrate, said process comprising:
providing a coating of a reactive composition comprising: (i) light metal oxide precursor, (ii) non-aqueous solvent, and (iii) water on said substrate;
heating the coated substrate for a time sufficient to densify the coating material to form a densified coating comprising light metal oxide; and
exposing said densified coating at an elevated temperature to an atmosphere comprising fluorine gas or a gaseous fluorine producing compound for a time sufficient to replace only a portion of the oxygen atoms of said light metal oxide with fluoride atoms so that said densified, coating comprises a concentration gradient of light metal fluoride, said concentration gradient being such that said densified coating comprises a greater concentration of light metal fluoride in a region of said ceramic coating distant from said substrate surface and a lesser concentration of light metal fluoride in a region of said densified coating nearer said substrate surface.

11. The process according to claim 10, wherein said light metal oxide precursor is selected from the group consisting essentially of light metal alkoxides, light metal nitrates, light metal acid tartrates, and light metal acetates.

12. The process according to claim 10, wherein said light metal oxide precursor comprises magnesium oxide precursor.

13. The process according to claim 10, wherein said composition further comprises other oxide precursors selected from silicon oxide precursors, zirconium oxide precursors, titanium oxide precursors, cerium oxide precursors, or aluminum oxide precursors.

14. The process according to claim 13, wherein said other oxide precursors are selected from alkoxides, nitrates, acid tartrates, or acetates.

15. The process according to claim 10, wherein said pH of said reactive composition is adjusted to less than about 6.0 by means of an acid.

16. The process according to claim 10, wherein said water is provided in said reactive composition coating by exposing a coating comprising said light metal oxide (i) and said non-aqueous solvent (ii) to water vapor.

17. The process according to claim 10, wherein said process further comprises causing said reactive composition to become viscous prior to providing it on said substrate.

* * * * *